(12) United States Patent
Muegge (10) Patent No.: US 11,933,472 B2
(45) Date of Patent: Mar. 19, 2024

(54) LIGHTING DEVICE FOR A MOTOR VEHICLE

(71) Applicant: HELLA GmbH & Co. KGaA, Lippstadt (DE)

(72) Inventor: Martin Muegge, Geseke (DE)

(73) Assignee: Hella GmbH & CO. KGAA, Lippstadt (DE)

( * ) Notice: Subject to any disclaimer, the term of this patent is extended or adjusted under 35 U.S.C. 154(b) by 0 days.

(21) Appl. No.: 18/096,799

(22) Filed: Jan. 13, 2023

(65) Prior Publication Data
US 2023/0228398 A1    Jul. 20, 2023

(30) Foreign Application Priority Data
Jan. 14, 2022    (DE) ...................... 10 2022 100 799.5

(51) Int. Cl.
| F21S 43/242 | (2018.01) |
| F21S 43/20 | (2018.01) |
| F21S 43/31 | (2018.01) |
| F21V 3/04 | (2018.01) |
| G02B 5/32 | (2006.01) |

(52) U.S. Cl.
CPC ............. F21S 43/242 (2018.01); F21S 43/26 (2018.01); F21S 43/31 (2018.01); F21V 3/049 (2013.01); G02B 5/32 (2013.01)

(58) Field of Classification Search
CPC .. F21S 43/235–251; F21S 41/20; F21S 41/24; G02B 5/32
See application file for complete search history.

(56) References Cited

U.S. PATENT DOCUMENTS 11,391,435 B2    7/2022   Thomae et al.

FOREIGN PATENT DOCUMENTS

| DE | 69305292 T2 | 3/1997 | |
| DE | 102017206882 A1 | 10/2018 | |
| DE | 102017124296 A1 | 4/2019 | |
| DE | 102020131627 A1 | 6/2022 | |
| WO | WO-2018069792 A1 * | 4/2018 | ............. B60Q 1/302 |
| WO | WO-2022111978 A1 * | 6/2022 | |

* cited by examiner

*Primary Examiner* — Mariceli Santiago
(74) *Attorney, Agent, or Firm* — Muncy, Geissler, Olds & Lowe, P.C.

(57) ABSTRACT

A lighting device for a motor vehicle having a light source, a light guide with an entrance surface, and a hologram disposed on or in the light guide. The lighting device is configured such that light emanating from the light source enters the entrance surface of the light guide and interacts with the hologram so that an image stored in the hologram is reconstructed and is visible to an observer of the lighting device. The light guide has a first exit surface and a second exit surface. The lighting device is configured such that light that has interacted with the hologram exits through the first exit surface and that light that has not interacted with the hologram exits through the second exit surface.

15 Claims, 6 Drawing Sheets

LIGHTING DEVICE FOR A MOTOR VEHICLE

This nonprovisional application claims priority under 35 U.S.C. § 119(a) to German Patent Application No. 10 2022 100 799.5, which was filed in Germany on Jan. 14, 2022, and which is herein incorporated by reference.

BACKGROUND OF THE INVENTION

Field of the Invention

The present invention relates to a lighting device for a motor vehicle.

Description of the Background Art

A lighting device is known from DE 10 2017 124 296 A1. The lighting device described therein comprises a light source configured as a light-emitting diode (LED), a light guide having an entrance surface and a reflecting region, as well as a hologram disposed on the light guide. In this case, light emanating from the light source enters the entrance surface of the light guide in the direction of the reflecting region and is reflected from it into the interior of the light guide in the direction of the hologram. For example, by exposing the hologram to light, images stored in the hologram can be reconstructed to create light signatures.

In order to generate a hologram with good imaging quality in the existing tight installation space conditions in automotive lighting technology, a small light source is required, which is provided with the available light-emitting diodes. If the structure of a typical reflection hologram system or edge-lit hologram system is considered, it is noticeable that the efficiency of the system is rather low.

In the edge-lit hologram, there is a defined light guide entrance surface which is illuminated by the light source. A usually small solid angle, which describes the light that can be used by the light source, results with the distance of the light source to the light entrance surface. The light emitted by the light source into the space adjacent to the entrance surface cannot be used by the light guide and the hologram. Furthermore, the overall efficiency is determined by the graphics of the holographic image, wherein the larger the light-emitting area in relation to the total hologram area, the better the efficiency. Because a 3D signature is usually created with illuminated areas or lighting elements distributed in space, such as, for example, lines, stripes, surfaces, blocks, or bodies, only part of the hologram surface is illuminated in the end. Overall, therefore, only a low level of efficiency is available.

The efficiency of the hologram itself must also still be considered because the hologram is calculated for a small range of wavelengths, ideally for a single wavelength. In contrast, a typically used light-emitting diode has a spectral width of 18 nm to 20 nm.

The total efficiency of a lighting device with a light-emitting diode, a light guide, and a hologram will be estimated in a short sample calculation. In this case, an exemplary luminous flux of a red light-emitting diode of 30 lm is assumed. For example, the portion of the light from the light-emitting diode entering the entrance surface of the light guide is 20%. This leaves only 6 lm. If the area ratio between the illuminated area of the hologram and the total area of the hologram is 50%, 3 lm still remain. If then an efficiency of the hologram of 70% is assumed, the resulting luminous flux is 2.1 lm. Thus, the overall efficiency of the lighting device is 7%.

It follows that with the holographic function alone it is impossible to fulfill a desired signal function in the form of a taillight, brake light, direction indicator, or daytime running light. The light output of the light-emitting diode would have to be selected significantly higher, which is very difficult or costly for physical reasons and due to the chip size usually used, as well as from thermal points of view.

SUMMARY OF THE INVENTION

It is therefore an object of the present invention to provide a lighting device that has an increased overall efficiency despite a relatively small installation space.

In an exemplary embodiment, it is provided that the light guide has a first exit surface and a second exit surface, wherein the lighting device is configured such that light that has interacted with the hologram or interacts with the hologram during the exit or after the exit from the first exit surface exits through the first exit surface, and that light that has not interacted with the hologram and does not interact with the hologram during the exit or after the exit from the second exit surface exits through the second exit surface. Thus, in addition to generating a holographic image in, for example, a larger surface region of the light guide, a, for example, smaller region of the light guide is provided for use as conventional light transmission and light deflection. As a result, efficiency is improved because a greater proportion of the available light from the light source is used to generate higher light intensities to fulfill a lighting function. This makes it possible to implement a signal function which uses only the installation space and the size of the light guide and, in particular, does not require any further additional illuminated areas or additional light functions.

It can be provided that the second exit surface is arranged on the same side of the light guide as the first exit surface. Both the light passing through from the second exit surface and the light corresponding to the reconstructed image of the hologram can thereby exit the light guide substantially in the same direction and thus together contribute to a signal function.

It is possible that the second exit surface may be arranged adjacent to the first exit surface, in particular wherein the second exit surface directly adjoins the first exit surface or wherein the second exit surface is spaced apart from the first exit surface. Furthermore, it can be provided that the second exit surface is parallel to the first exit surface or that the normal to the second exit surface encloses an angle not equal to 0° with the normal to the first exit surface. Both measures can improve the interaction of the light components coupled out of the light guide by the two exit surfaces when generating a signal function.

It is possible that the lighting device comprises a shield which can be disposed between the second exit surface and the first exit surface and/or conceals a section of the second exit surface and/or conceals a section of the first exit surface. A demarcation of the second directly light-emitting exit surface from the first exit surface can be made possible by a shield in front of the light guide; this effects a design-related separation of the two light regions, even though the lighting element or the light guide behind it is made in one piece.

It can be provided that the second exit surface can be offset relative to the first exit surface, particularly in a direction parallel to the normal to the first exit surface. The possibility to offset the second exit surface relative to the first exit surface, for example, to allow it to project, results in an additional degree of freedom in the design of the light guide or the light-emitting surface for the generation of high intensities of a signal function.

It is possible that the second exit surface can have a scattering optic, in particular in the form of a pillow optic or a linear optic, and/or that the second exit surface has a structure, in particular an optical structure, such as, for example, a textured structure or etched structure, or a diffractive diffuser structure. The distribution of the light exiting through the second exit surface can be influenced thereby in a targeted manner.

It can be provided that the light guide can have a first reflecting region, wherein the lighting device is configured such that light emanating from the light source enters the entrance surface of the light guide in the direction of the first reflecting region and is reflected from the first reflecting region in the interior of the light guide in the direction of the hologram. It can be further provided that the light guide has a second reflecting region, wherein the lighting device is configured such that light emanating from the light source enters the entrance surface of the light guide in the direction of the second reflecting region and is reflected from the second reflecting region in the interior of the light guide in the direction of the second exit surface. The reflecting regions result in folded beam paths of the light interacting with the hologram and of the light emerging directly, so that the lighting device requires a smaller installation space overall.

It is possible that the lighting device can be configured such that light emanating from the light source enters the entrance surface of the light guide in the direction of the first reflecting region, that a portion of the light entering the light guide is reflected from the first reflecting region in the interior of the light guide in the direction of the second reflecting region, and that a portion of the light impinging on the second reflecting region is reflected from the second reflecting region in the interior of the light guide in the direction of the second exit surface. It is possible furthermore that the lighting device is configured such that light emanating from the light source enters the entrance surface of the light guide in the direction of the second reflecting region, that a portion of the light entering the light guide is reflected from the second reflecting region in the interior of the light guide in the direction of the first reflecting region, and that a portion of the light impinging on the first reflecting region is reflected from the first reflecting region in the interior of the light guide in the direction of the hologram. Both measures optimize the beam paths inside the light guide so that a reliable light deflection to the hologram and the two exit surfaces occurs in a small installation space.

It can be provided that the lighting device comprises a reflector arranged outside the light guide, wherein the lighting device is configured such that light emanating from the light source impinges on the reflector, is reflected by the reflector in the direction of the light guide, in particular in the direction of an additional entrance surface of the light guide and enters the light guide in the direction of the second exit surface. This can increase the efficiency with which light emanating from the light source reaches the second exit surface. Furthermore, the additional reflector allows light that would not have entered the light guide directly through the entrance surface to be used for the signal function to be achieved.

There is a possibility that the hologram is an edge-lit hologram, in particular wherein the illumination angle of the hologram may be greater than the critical angle of the total reflection at the first exit surface of the light guide. Due to such a large illumination angle, the portion of the light, impinging on the out-coupling surface, said portion not interacting with the hologram, is totally reflected and does not emerge from the out-coupling surface. This can prevent interference from unintentionally escaping light, especially by suppressing the 0th order of light. This increases the quality of the holographic image and the reconstruction of the image stored in the hologram.

It can be provided that the hologram can be a transmission hologram arranged in particular on the first exit surface of the light guide. The transmission hologram can be formed as a volume hologram stored in a film, wherein the film can be glued to the outside of the first exit surface.

Alternatively, it can be provided that the hologram can be a reflection hologram arranged in particular on a surface of the light guide opposite the first exit surface of the light guide. For example, the reflection hologram can also be formed as a volume hologram stored in a film, wherein the film can be glued to the light guide side facing away from the first exit surface.

The lighting device with the light source and the light guide can be used as a single element, for example, for a taillight or position light. Alternatively, the lighting device can also be used in a multiple arrangement, in particular with light guides arranged next to one another for an elongated functional arrangement, for example, for a direction indicator, a brake light, or a position daytime running light. This is useful especially when an element alone does not meet the light values or the required area of the intended function.

For the red signal functions such as a taillight and a brake light, or for the yellow signal function such as a direction indicator, the color of the holographic image can correspond to the color of the signal function. In the case of the white signal functions, i.e., a position light and daytime running light, the hologram can be designed for any wavelength of a white light-emitting diode spectrum and thus light up in a defined and desired color, for example, blue, green, yellow, red, cyan, magenta, or another color.

The hologram can show any image or any graphic, such as, for example, a manufacturer's logo or an arrow graphic for the direction indicator, or letters or writing or other content, such as, for example, for a welcome and goodbye function when opening and closing the vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
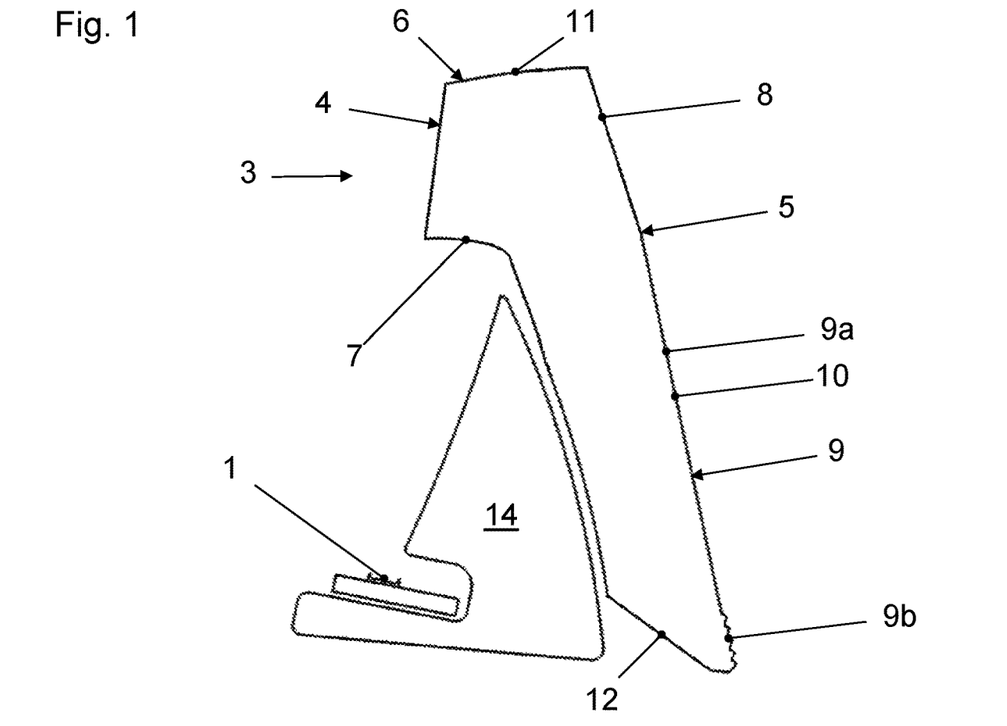
FIG. 1 shows a sectional view of a first embodiment of a lighting device of the invention.
Figure 2:
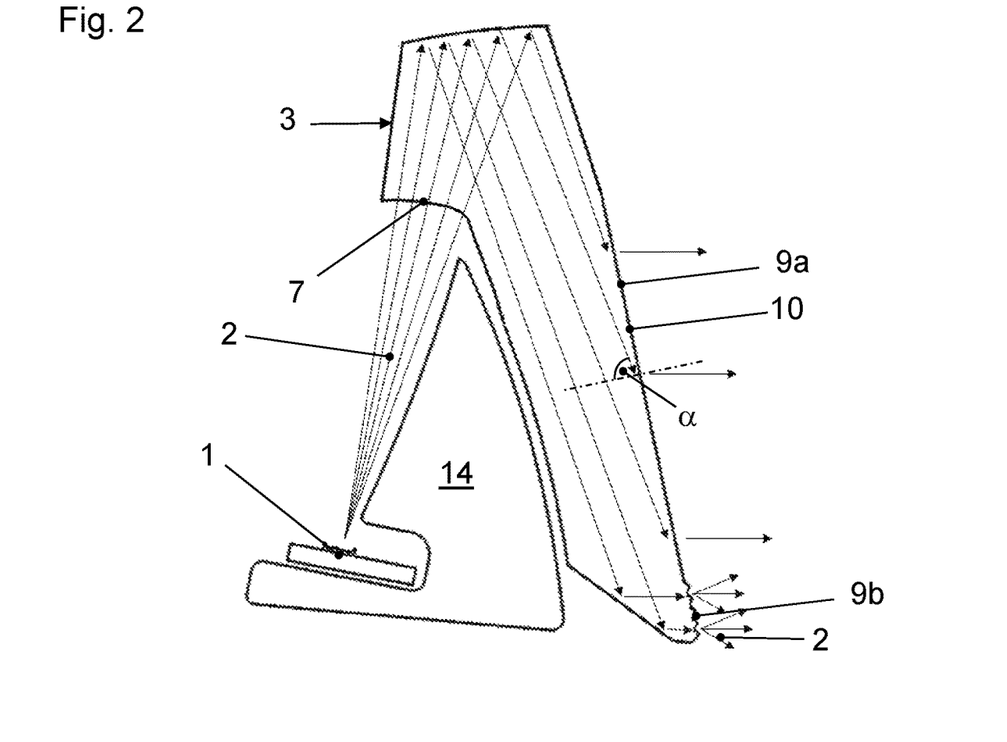
FIG. 2 shows a sectional view of the lighting device according to FIG. 1 with light beams drawn in schematically.
Figure 3:
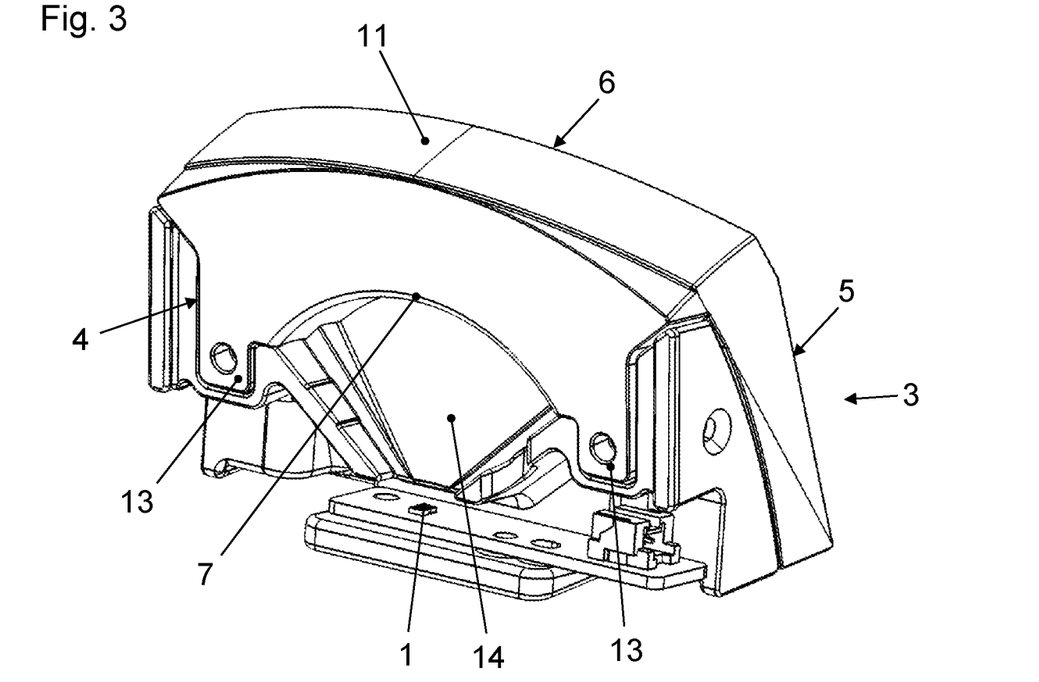
FIG. 3 shows a perspective view of the lighting device according to FIG. 1.

An example of a lighting device of the invention illustrated in FIG. 1 to FIG. 3 comprises a light source 1 in the form of a light-emitting diode (LED), from which light 2 emanates during operation of the lighting device.

The lighting device further comprises a light guide 3 having a substantially V-shaped cross-section (see FIG. 3). Light guide 3 has a first leg 4, a second leg 5, and a connecting region 6 connecting the two legs 4, 5. In this case, first leg 4 is formed significantly shorter than second leg 5.

First leg 4 has an entrance surface 7 at its end facing away from connecting region 6 for light 2 emanating from light source 1 (see FIG. 2). Entrance surface 7 is concavely curved and, in particular, has the shape of a partial hollow sphere, thus achieving a neutral light entrance adapted to the divergence of light 2 emanating from light source 1.

Starting from entrance surface 7, first leg 4 widens in a V-shape in a transverse direction (see the direction from left to right in FIG. 3) until it reaches its greatest extent in connecting region 6. It is achieved by the V-shaped widening that there is space on the outer sides of first leg 4 for fastening elements 13 with which light guide 3 can be attached. Entrance surface 7 is arranged next to and to a large extent above the two fastening elements 13 (see FIG. 3).

Second leg 5 has an upper section 8 and a lower section 9 slightly angled relative to upper section 8. Lower section 9 of second leg 5 forms, on its side facing away from first leg 4, a first exit surface 9a to which a hologram 10 in the form of a volume hologram read into a film is applied, in particular glued, from the outside.

Below first exit surface 9a, a second exit surface 9b is formed which is less extensive in the vertical direction in FIG. 1 and FIG. 2. This is provided with a scattering optic, especially in the form of a pillow optic or a linear optic.

Alternatively, or in addition, a structure can also be provided, in particular an optical structure, such as, for example, a textured structure or etched structure, or a diffractive diffuser structure.

Hologram 10 is a transmission hologram with which the light passing through from the exit surface can interact. If the angle between the two legs 4, 5 is correspondingly small, the hologram is also an edge-lit hologram, because then the illumination angle α becomes relatively large, under which hologram 10 must be illuminated in order to reconstruct the holographic image (see FIG. 2 on this point).

Alternatively, it can be provided that instead of hologram 10 formed as a transmission hologram, a reflection hologram is provided, which is arranged on the surface of second leg 5, said surface facing first leg 4. For example, the reflection hologram can also be formed as a volume hologram stored in a film, wherein the film can be glued to the surface of lower section 9 of second leg 5, said surface facing first leg 4. In this case, light emanating from the reflection hologram can exit light guide 3 through first exit surface 9a formed on the side of lower portion 9 of second leg 5, said side facing away from first leg 4. The reflection hologram can also be formed as an edge-lit hologram, which is illuminated at large angles.

A shield 14 is provided between the two legs 4, 5. Shield 14 can be blackened, in particular on its side facing the second leg. Shield 14 prevents light 2 emanating from light source 1 from directly entering second leg 5, because second leg 5 of light guide 3 is concealed by shield 14.

For the most part, connecting region 6 is provided externally with a reflective coating and thus serves as first reflecting region 11. Accordingly, light 2 emanating from light source 1 and entering light guide 3 through entrance surface 7 will pass through first leg 4, impinge on reflecting region 11, and be reflected downward by it into second leg 5 in FIG. 2. In second leg 5, a portion of light 2 passes through the first exit surface of lower section 9 of second leg 5 into hologram 10.

Figure 9:
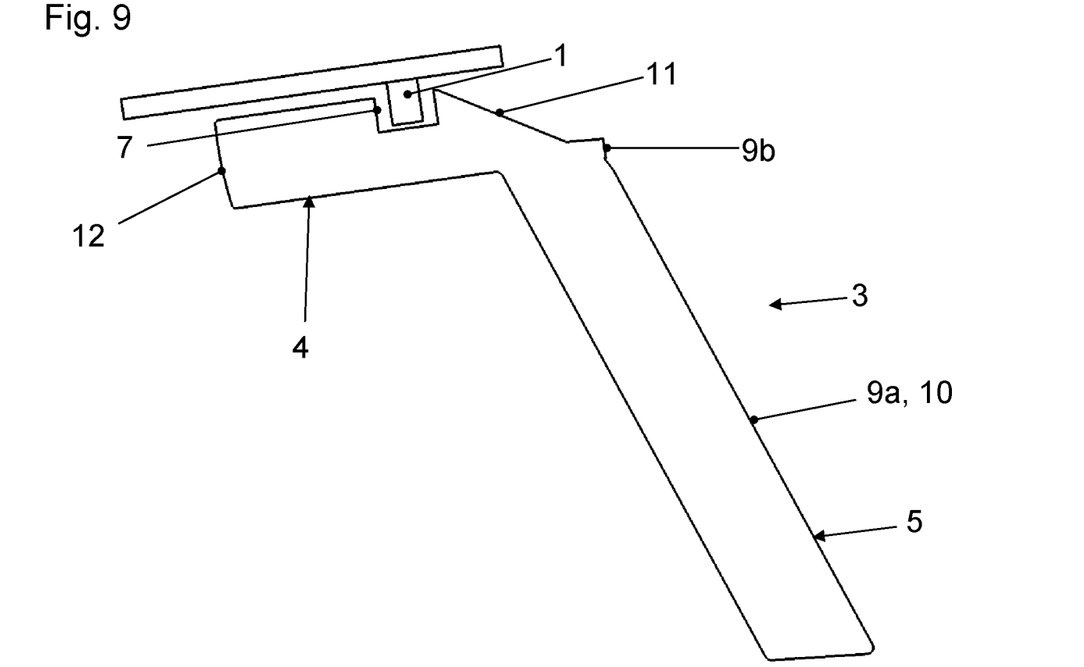
FIG. 9 shows a sectional view of the lighting device according to FIG. 7.
Figure 10:
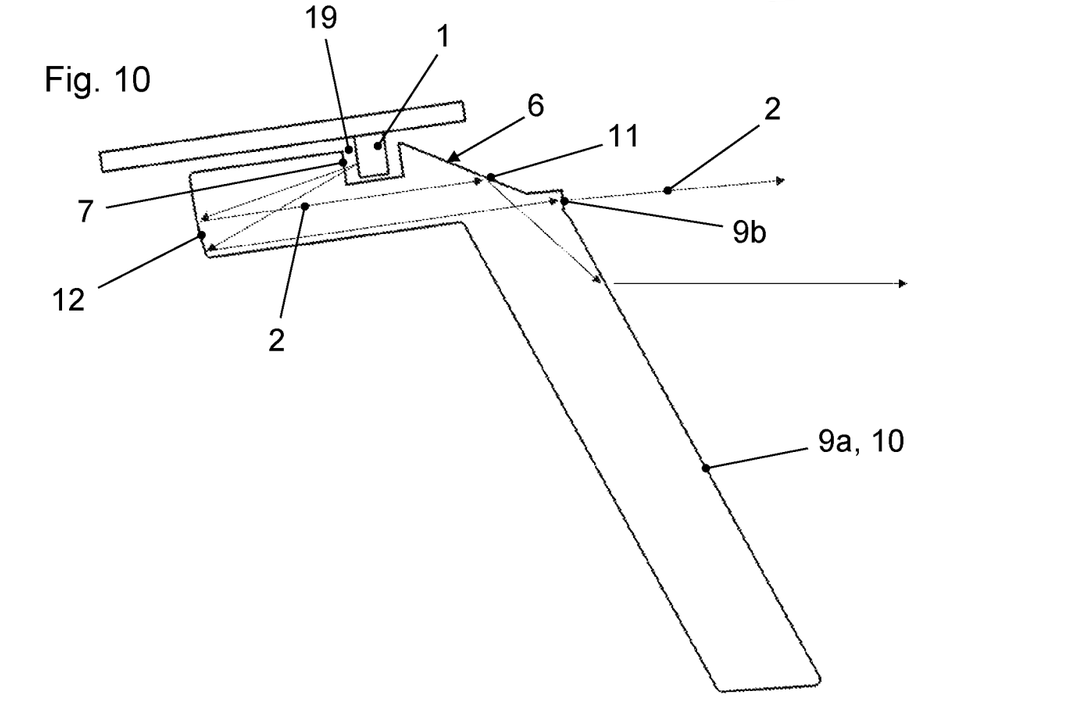
FIG. 10 shows a sectional view of the lighting device according to FIG. 7 with light beams drawn in schematically.

In this case, first reflecting region 11 is convexly curved and, in particular, designed as a paraboloidal surface. This curvature achieves that the portions of light 2 impinging on first reflecting region 11 at different angles are reflected downward substantially in the same direction in FIG. 9. The substantially parallel light beams of light 2 ensure substantially equal illumination angles α of hologram 10, which is advantageous for an effective reconstruction of the holographic image.

Alternatively, it can be provided that first reflecting region 11 is designed as a free-form surface in order to enable a further optimization of the illumination or to enable an optimal adaptation to the coupled-in light 2 of light source 1. First reflecting region 11 can alternatively be provided with additional optics depending on the desired light shaping of reflected light 2.

At the lower end of second leg 5, a second reflecting region 12 is formed by a slanted section, which reflects light 2, which has emanated from first reflecting region 11 and has moved past exit surface 9a in the direction of second exit surface 9b. This light 2 can then exit light guide 3 to the right in FIG. 2.

In the embodiment according to FIG. 4, second exit surface 9b is not provided below but above first exit surface 9a. In order to direct light 2 entering light guide 3 through entrance surface 7 directly to second exit surface 9b, second reflecting region 12 is not provided at the lower end of second leg 5, but is arranged on the side of connecting region 6, said side facing away from second leg 5. Light 2 is reflected directly forward from second reflecting region 12 and exits light guide 3 through second exit surface 9b, without this light interacting with or interfering with hologram 10.

A shield 15 is provided in front of second leg 5 of light guide 3 between the first and second exit surfaces 9a, 9b. A demarcation of the directly light-emitting second exit surface 9b from the first exit surface 9a can be made possible by means of a shield 15; this effects a design-related separation of the two light regions, even though light guide 3 behind it is made in one piece.

It is entirely possible to provide a shield of this type also in the embodiment according to FIG. 1 to FIG. 3.

Figure 4:
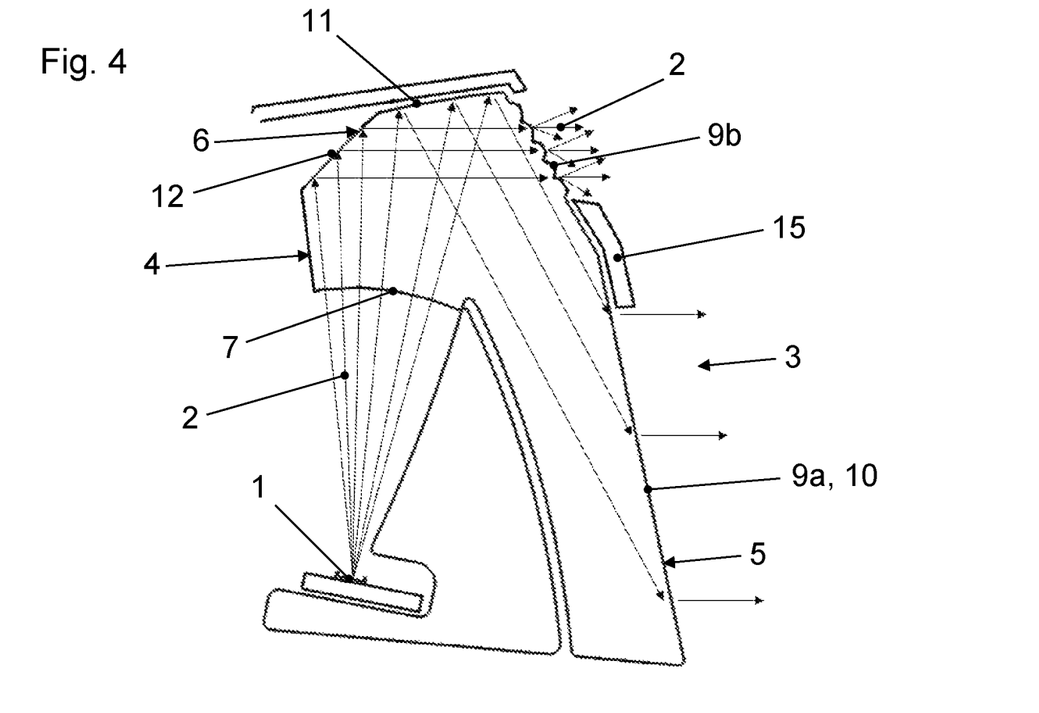
FIG. 4 shows a sectional view of a second embodiment of a lighting device of the invention with light beams drawn in schematically.
Figure 5:
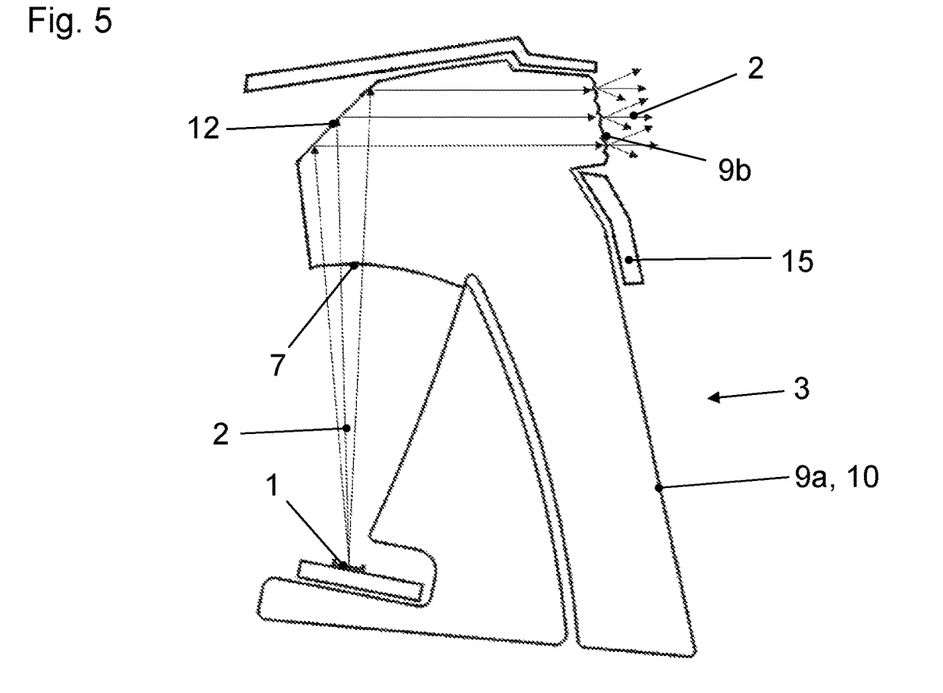
FIG. 5 shows a sectional view of a third embodiment of a lighting device of the invention with light beams drawn in schematically.

The embodiment according to FIG. 5 differs from that according to FIG. 4 in that second exit surface 9b projects somewhat from second leg 5 of light guide 3. It is thereby offset relative to first exit surface 9a in a direction that is parallel to the normal to first exit surface 9a.

Figure 6:
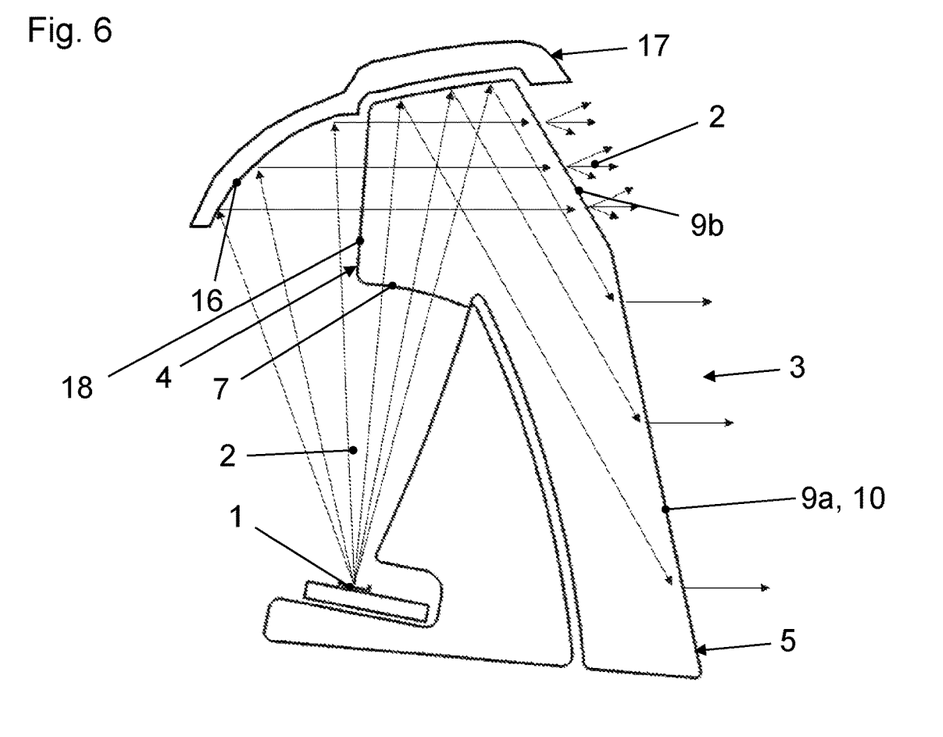
FIG. 6 shows a sectional view of a fourth embodiment of a lighting device of the invention with light beams drawn in schematically.
Figure 7:
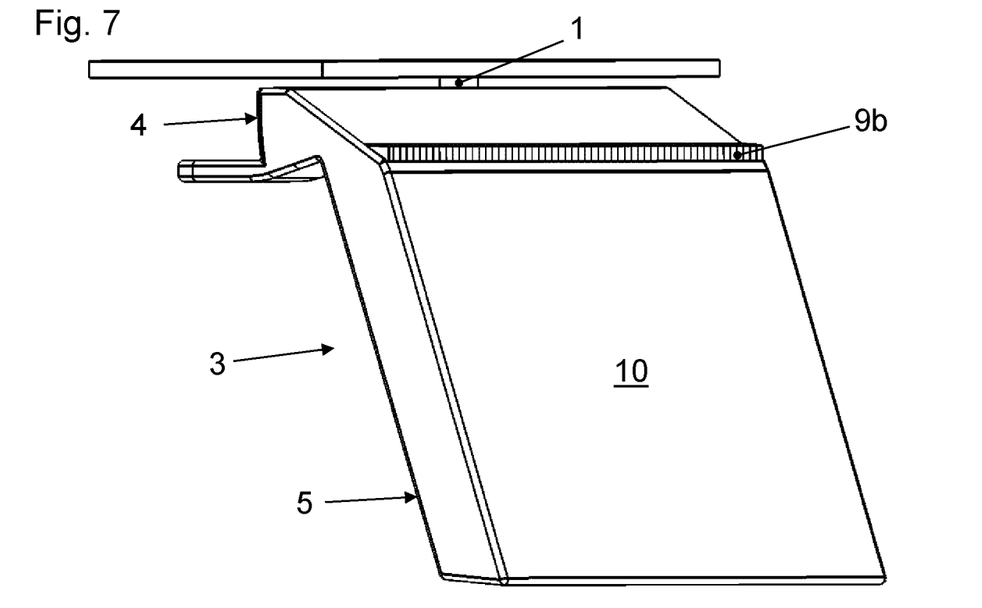
FIG. 7 shows a perspective view of a fifth embodiment of a lighting device of the invention.

The embodiment of a lighting device of the invention illustrated in FIG. 6 also has an exit surface 9b arranged above first exit surface 9a. This lighting device comprises a reflector 16 arranged outside the light guide. In particular, this reflector 16 can be connected to a shield 17, preferably integrally connected to shield 17, which conceals light guide 3 in the upper region. Alternatively, shield 17 can also be omitted.

In this embodiment, first leg 4 of light guide 3 has an additional entrance surface 18, which is arranged on the side of first leg 4, said side facing away from second leg 5. In this case, light 2 emanating from light source 1 strikes reflector 16, is reflected by reflector 16 in the direction of the additional entrance surface 18 and enters the light guide through the latter in the direction of second exit surface 9b. A portion of light 2 reflected by reflector 16 can exit light guide 3 through second exit surface 9b.

The embodiment of a lighting device of the invention illustrated in FIGS. 7 to 10 comprises a light-emitting diode serving as light source 1, from which the light emerges laterally. The lighting device comprises a light guide 3 which is adapted to this type of light-emitting diodes and is formed substantially L-shaped and has first leg 4 and second leg 5, wherein the two legs 4, 5 enclose an obtuse angle.

First leg 4 has a recess 19 on its upper side into which light source 1 projects. In recess 19, on the left side in FIG. 9 or on the side facing away from second leg 5, entrance surface 7 is formed for light 2 emanating from light source 1 (see FIG. 10).

Figure 8:
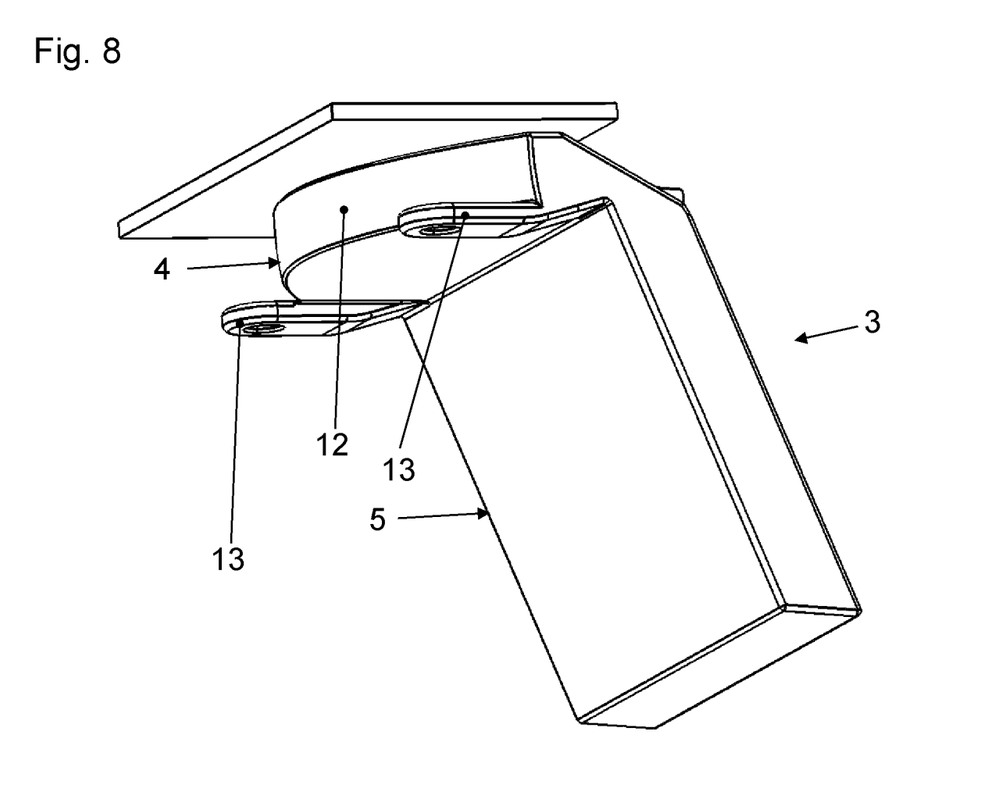
FIG. 8 shows a further perspective view of the lighting device according to FIG. 7.

Second reflecting region 12 is arranged at the end of first leg 4, said end facing away from second leg 5, whereas first reflecting region 11 is arranged in connecting region 6 between the first and second legs 4, 5. FIG. 8 shows that the second reflecting region is concavely curved, in particular cylindrically curved. First reflecting region 11, on the other hand, is formed flat. In this case, first reflecting region 11 is inclined both to first leg 4 and to second leg 5.

As in the embodiments according to FIG. 1 to FIG. 6, first exit surface 9a occupies the largest part of the side of second leg 5, said side facing away from first leg 4. Second exit surface 9b is relatively narrow and arranged between first reflecting region 11 and first exit surface 9a (see FIG. 7, FIG. 9, and FIG. 10).

Light 2 emanating from light source 1 enters first leg 4 of light guide 3 through entrance surface 7 in the direction of second reflecting region 12. From second reflecting region 12, a portion of light 2 entering light guide 3 is reflected in the interior the light guide in the direction of first reflecting region 11 and reflected from this region in the direction of the hologram. This portion of light 2 can interact with hologram 10 and reconstruct the image stored in hologram 10. A further portion of light 2 impinging on second reflecting region 12 is reflected from it directly onto second exit surface 9b, through which light 2 can exit directly from light guide 3 (see FIG. 10).

Figure 11:
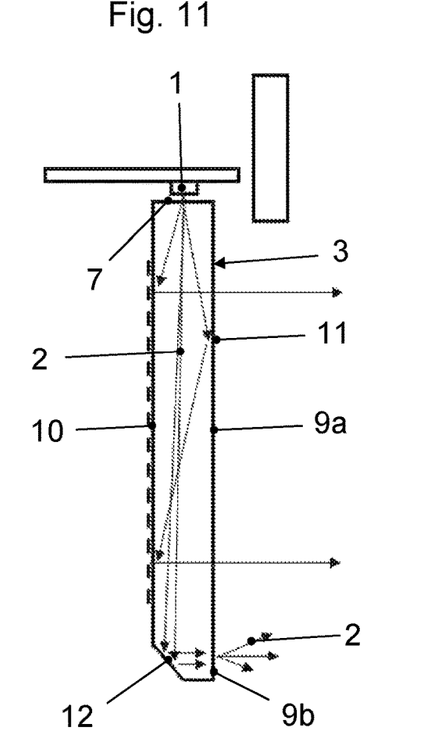
FIG. 11 shows a sectional view of a sixth embodiment of a lighting device of the invention with light beams drawn in schematically.
Figure 12:
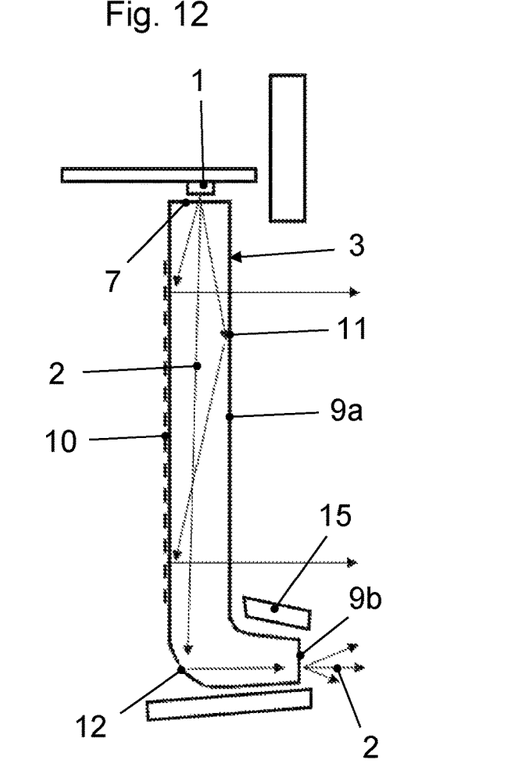
FIG. 12 shows a sectional view of a seventh embodiment of a lighting device of the invention with light beams drawn in schematically.

In the embodiments according to FIG. 11 and FIG. 12, the light guide is formed as a flat, substantially disk-shaped light guide 3, which together with hologram 10 forms a so-called waveguide hologram system. In the illustrated exemplary embodiments, entrance surface 7 of light guide 3 is arranged at the upper end face of light guide 3.

Hologram 10 is designed as a reflection hologram and is arranged on the left longitudinal side in FIG. 11 and FIG. 12. First exit surface 9a is formed on the side of light guide 3, said side being opposite hologram 10. First exit surface 9a can serve, at least in part, as a first reflecting region that reflects light 2 in the direction of hologram 10.

For example, the reflection hologram can also be formed as a volume hologram stored in a film, wherein the film can be glued to the left outer side of light guide 3 in FIG. 11 and FIG. 12. The reflection hologram can also be formed as an edge-lit hologram, which is illuminated at large angles.

Alternatively, hologram 10 can also be formed as a transmission hologram that is formed on first exit surface 9a, in particular that is glued onto first exit surface 9a from the outside. In this case, the surface opposite first exit surface 9a can serve, at least in part, as a first reflecting region that reflects light 2 in the direction of hologram 10. The transmission hologram can also be formed as an edge-lit hologram, which is illuminated at large angles.

Light 2 entering light guide 3 through entrance surface 7 can move downward from entrance surface 7 in FIG. 11 and FIG. 12, and thereby be reflected multiple times on the two long sides. Light 2 interacting with hologram 10 reconstructs the image which is stored in hologram 10 and is visible from the outside through first exit surface 9a.

In the exemplary embodiment according to FIG. 11, second exit surface 9b adjoins first exit surface 9a at the bottom. A bevel is formed at the lower end of light guide 3 in FIG. 11, which serves as a second reflecting region 12 for light 2 that has not interacted with hologram 10. This light 2 is reflected by the second reflecting region 12 in the direction of second exit surface 9b and exits from this surface.

In the exemplary embodiment according to FIG. 12, second exit surface 9b is also disposed below first exit surface 9a. However, it projects outwards in relation to the latter. The lower end region of light guide 3 has a geometric shape serving as a second reflecting region 12 for light deflection and forwarding the light to second exit surface 9b. In this exemplary embodiment, a shield 15 is provided between the first and second exit surfaces 9a, 9b.

The lighting device with light source 1 and light guide 3 can be used as a single element, for example, for a taillight or position light. Alternatively, the lighting device can also be used in a multiple arrangement, in particular with light guides 3 arranged next to one another for an elongated functional arrangement, for example, for a direction indicator, a brake light, or a position daytime running light.

Hologram 10 can show any image or any graphic, such as, for example, a manufacturer's logo or arrow graphic for a direction indicator, or letters or writing or other content, such as, for example, for a welcome and goodbye function when opening and closing the vehicle.

For the red signal functions such as a taillight and a brake light, or for the yellow signal function such as a direction indicator, the color of the holographic image can correspond to the color of the signal function.

Figure 13:
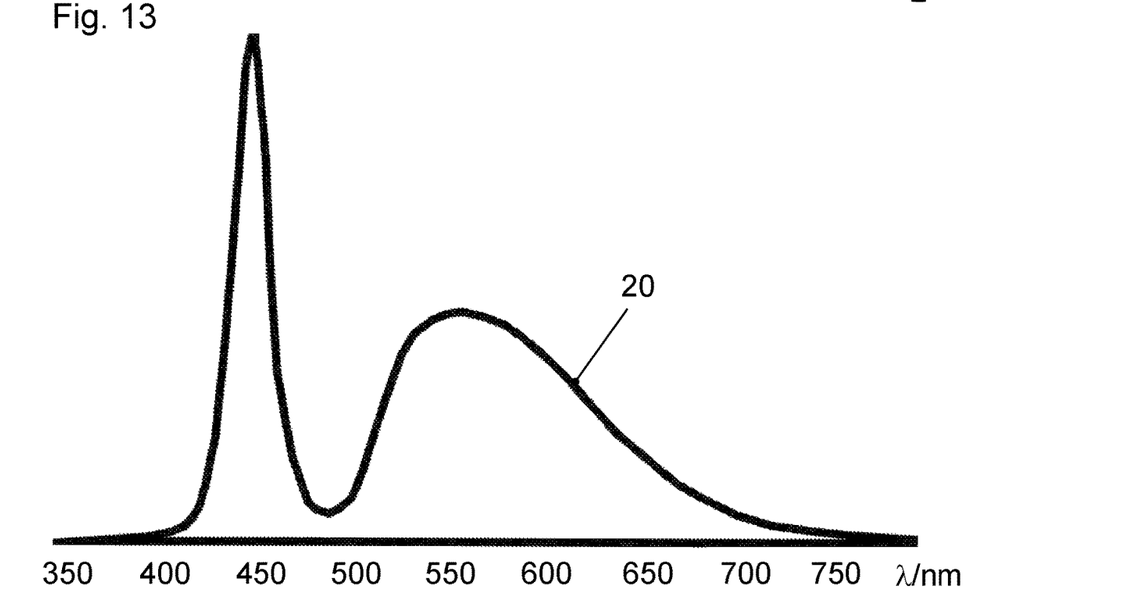
FIG. 13 shows the wavelength spectrum of a white light-emitting diode serving as the light source of a lighting device of the invention.

A white LED can be used for the white signal functions such as a position light and daytime running light. The wavelength spectrum of the white light-emitting diode runs through the entire color range from blue to red with varying intensity. FIG. 13 shows a typical wavelength spectrum of a white light-emitting diode, wherein the intensity 20 is plotted in arbitrary units A versus the wavelength in nm.

Because the white light-emitting diode is based on a blue chip, which generates white light by means of a converter, in particular by means of a phosphor conversion, for complementary light in total by color mixing, there is a high intensity peak in the blue range at about 450 nm, which drops to a minimum up to cyan at about 490 nm. A further high intensity peak is present in the green-yellow range between 530 nm and 590 nm, whereas in the red range at about 640 nm there are again rather reduced light outputs.

When a white light-emitting diode is used, the hologram can be designed for any wavelength of a white light-emitting diode spectrum and thus can light up in a defined and desired color, for example, blue, green, yellow, red, cyan, magenta, or any other color.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting device for a motor vehicle, the lighting device comprising:
   a light source;
   a light guide with an entrance surface; and
   a hologram disposed on or in the light guide;
   wherein the lighting device is configured such that light emanating from the light source enters the entrance surface of the light guide and interacts with the hologram so that an image stored in the hologram is reconstructed and is visible to an observer of the lighting device,
   wherein the light guide has a first exit surface and a second exit surface, such that the light entering the entrance surface of the light guide exits from both of the first exit surface and the second exit surface,
   wherein the lighting device is configured such that light that has interacted with the hologram exits through the first exit surface, the light interacting with the hologram either during the exit or after the exit from the first exit surface, and the lighting device is configured such that light that has not interacted with the hologram exits through the second exit surface, the light not interacting with the hologram either during the exit or after the exit from the second exit surface.

2. The lighting device according to claim 1, wherein the second exit surface is arranged on a same side of the light guide as the first exit surface.

3. The lighting device according to claim 1, wherein the second exit surface is arranged adjacent to the first exit surface or wherein the second exit surface directly adjoins the first exit surface or wherein the second exit surface is spaced apart from the first exit surface.

4. The lighting device according to claim 1, wherein the second exit surface is parallel to the first exit surface or wherein a normal to the second exit surface encloses an angle not equal to 0° with the normal to the first exit surface.

5. The lighting device according to claim 1, wherein the lighting device comprises a shield that is disposed between the second exit surface and the first exit surface and/or conceals a portion of the second exit surface and/or conceals a portion of the first exit surface.

6. The lighting device according to claim 1, wherein the second exit surface is offset relative to the first exit surface in a direction substantially parallel to the normal to the first exit surface.

7. The lighting device according to claim 1, wherein the second exit surface has a scattering optic in the form of a pillow optic or a linear optic, and/or wherein the second exit surface has a structure or an optical structure or a textured structure or etched structure or a diffractive diffuser structure.

8. The lighting device according to claim 1, wherein the light guide has a first reflecting region, wherein the lighting device is configured such that light emanating from the light source that has entered into an interior of the light guide through the entrance surface of the light guide and is directed toward the first reflecting region, is reflected from the first reflecting region in the direction of the hologram.

9. The lighting device according to claim 8, wherein the light guide has a second reflecting region, wherein the lighting device is configured such that light emanating from the light source that has entered into the interior of the light guide through the entrance surface of the light guide and is directed toward the second reflecting region, is reflected from the second reflecting region in the direction of the second exit surface.

10. The lighting device according to claim 1, wherein the hologram is an edge-lit hologram, or wherein an illumination angle of the hologram is greater than a limiting angle of total reflection at the first exit surface of the light guide.

11. The lighting device according to claim 1, wherein the hologram is a transmission hologram arranged on the first exit surface of the light guide.

12. The lighting device according to claim 1, wherein the hologram is a reflection hologram arranged on a surface of the light guide opposite the first exit surface of the light guide.

13. A lighting device for a motor vehicle, the lighting device comprising:
   a light source;
   a light guide with an entrance surface; and
   a hologram disposed on or in the light guide;
   wherein the lighting device is configured such that light emanating from the light source enters the entrance surface of the light guide and interacts with the hologram so that an image stored in the hologram is reconstructed and is visible to an observer of the lighting device,
   wherein the light guide has a first exit surface and a second exit surface,
   wherein the lighting device is configured such that light that has interacted with the hologram exits through the first exit surface, the light interacting with the hologram either during the exit or after the exit from the first exit surface, and the lighting device is configured such that light that has not interacted with the hologram exits through the second exit surface, the light not interacting with the hologram either during the exit or after the exit from the second exit surface,
   wherein the light guide has a first reflecting region, wherein the lighting device is configured such that light emanating from the light source that has entered into an interior of the light guide through the entrance surface of the light guide and is directed toward the first reflecting region, is reflected from the first reflecting region in the direction of the hologram, wherein the light guide has a second reflecting region, wherein the lighting device is configured such that light emanating from the light source that has entered into the interior of the light guide through the entrance surface of the light guide and is directed toward the second reflecting region, is reflected from the second reflecting region in the direction of the second exit surface, and wherein the light emanating from the light source and entering the entrance surface of the light guide is first directed towards the first reflecting region, wherein a portion of the light is reflected from the first reflecting region in the interior of the light guide in the direction of the second reflecting region, and wherein a portion of the light impinging on the second reflecting region is reflected from the second reflecting region in the interior of the light guide in the direction of the second exit surface.

14. A lighting device for a motor vehicle, the lighting device comprising:
a light source;
a light guide with an entrance surface; and
a hologram disposed on or in the light guide;
wherein the lighting device is configured such that light emanating from the light source enters the entrance surface of the light guide and interacts with the hologram so that an image stored in the hologram is reconstructed and is visible to an observer of the lighting device, wherein the light guide has a first exit surface and a second exit surface, wherein the lighting device is configured such that light that has interacted with the hologram exits through the first exit surface, the light interacting with the hologram either during the exit or after the exit from the first exit surface, and the lighting device is configured such that light that has not interacted with the hologram exits through the second exit surface, the light not interacting with the hologram either during the exit or after the exit from the second exit surface, wherein the light guide has a first reflecting region, wherein the lighting device is configured such that light emanating from the light source that has entered into an interior of the light guide through the entrance surface of the light guide and is directed toward the first reflecting region, is reflected from the first reflecting region in the direction of the hologram, wherein the light guide has a second reflecting region, wherein the lighting device is configured such that light emanating from the light source that has entered into the interior of the light guide through the entrance surface of the light guide and is directed toward the second reflecting region, is reflected from the second reflecting region in the direction of the second exit surface, and wherein the light emanating from the light source and entering the entrance surface of the light guide is first directed towards the second reflecting region, wherein a portion of the light is reflected from the second reflecting region in the interior of the light guide in the direction of the first reflecting region, and wherein a portion of the light impinging on the first reflecting region is reflected from the first reflecting region in the interior of the light guide in the direction of the hologram.

15. A lighting device for a motor vehicle, the lighting device comprising:
a light source;
a light guide with an entrance surface; and
a hologram disposed on or in the light guide;
wherein the lighting device is configured such that light emanating from the light source enters the entrance surface of the light guide and interacts with the hologram so that an image stored in the hologram is reconstructed and is visible to an observer of the lighting device, wherein the light guide has a first exit surface and a second exit surface, wherein the lighting device is configured such that light that has interacted with the hologram exits through the first exit surface, the light interacting with the hologram either during the exit or after the exit from the first exit surface, and the lighting device is configured such that light that has not interacted with the hologram exits through the second exit surface, the light not interacting with the hologram either during the exit or after the exit from the second exit surface, and wherein the lighting device comprises a reflector arranged outside the light guide, wherein the lighting device is configured such that light emanating from the light source impinges on the reflector and is reflected by the reflector in the direction of the light guide or in the direction of an additional entrance surface of the light guide and enters the light guide in the direction of the second exit surface.

\* \* \* \* \*